United States Patent [19]

Sumi et al.

[11] 4,281,045

[45] Jul. 28, 1981

[54] MULTI-LAYER EXTRUDED ARTICLE

[75] Inventors: Takehiko Sumi; Yoshinobu Oshige; Yoshio Koike; Kazuya Matsumoto, all of Kyoto, Japan

[73] Assignee: Kyoraku Co., Ltd., Kyoto, Japan

[21] Appl. No.: 98,891

[22] Filed: Nov. 29, 1979

[51] Int. Cl.$^3$ .................... B32B 27/30; B32B 27/32
[52] U.S. Cl. .................... 428/516; 426/127; 215/1 C; 428/35; 428/36; 428/515; 428/520; 428/522; 428/523
[58] Field of Search ............... 428/520, 516, 515, 35, 428/36, 522, 523; 426/127; 215/1 C

[56] References Cited

U.S. PATENT DOCUMENTS

| | | | |
|---|---|---|---|
| 3,282,729 | 11/1966 | Richardson | 428/520 |
| 3,540,962 | 11/1970 | Anzawa | 428/520 |
| 3,931,449 | 1/1976 | Hirata | 428/520 |
| 3,932,692 | 1/1976 | Hirata | 428/520 |
| 3,949,114 | 4/1976 | Viola | 428/520 |
| 4,082,854 | 4/1978 | Yamada | 428/520 |
| 4,151,318 | 4/1979 | Marshall | 428/520 |

*Primary Examiner*—Ellis P. Robinson
*Attorney, Agent, or Firm*—Armstrong, Nikaido, Marmelstein & Kubovcik

[57] ABSTRACT

A multi-layer extruded article useful for packaging materials, comprising a gas-barrier layer and a polyolefin layer laminated on at least one of the opposite sides of the gas-barrier layer, the gas-barrier layer being made of a mixture comprising a saponification product of an ethylene-vinyl acetate copolymer, a saponification product of an ethylene-vinyl acetate copolymer having a different ethylene content from the first saponification product, and a polyvinyl alcohol.

7 Claims, No Drawings

MULTI-LAYER EXTRUDED ARTICLE

BACKGROUND OF THE INVENTION

1. Field of the Invention

This invention relates to a multi-layer extruded article having good impermeability to gases and good adhesion between layers which comprises a gas-barrier layer and a polyolefin layer, the gas-barrier layer being formed of a saponification product of an ethylene-vinyl acetate copolymer.

2. Description of the Prior Art

Polyolefins, owing to their excellences in impermeability to water vapor, resistance to chemicals, transparency, hygiene, etc., have heretofore found extensive utility in applications to packaging materials. Nevertheless they are not completely satisfactory in the sense that they exhibit high degrees of permeability to oxygen gas, carbon dioxide gas and other similar gases and, accordingly, packages made thereof fail to preserve their contents intact for a long time.

In contrast, a saponification product of an ethylene-vinyl acetate copolymer having a low ethylene content (on the order of not more than 60 mol percent, for example) and a high saponification degree (on the order of not less than 80 percent, for example) (hereinafter generally called "saponification product") has an advantage that it exhibits notably lower permeability to oxygen gas than polyolefins. On the other hand, this saponification product suffers from a disadvantage that, because of its hydrophilicity, it exhibits high permeability to water vapor and, upon exposure to a highly moist atmosphere, shows enhanced permeability to gases such as oxygen gas.

In the circumstances, there has been felt a need of developing, as a packaging material combining the characteristics of polyolefins and those of the saponification product mentioned respectively above, a multi-layer extruded article formed in at least two layers, namely, comprising one layer of the saponification product and one polyolefin layer laminated on at least one of the opposite sides of the saponification product layer, particularly a multi-layer container formed in three or more layers, namely, comprising one layer of the saponification product and polyolefin layers laminated on the opposite sides of the saponification product layer.

When the multi-layer container mentioned above is produced by simultaneously extruding one layer of the saponification product (hereinafter called "gas-barrier layer") and at least two polyolefin layers in accordance with the co-extrusion process, because the saponification product and the polyolefin possess no affinity for each other, the extruded layers adhere to each other with insufficient fastness and, therefore, readily separate from each other. In most cases, accordingly, a multi-layer containers produced by this method fail to withstand the conditions of their actual use.

As a solution of this problem, Japanese Patent Publication No. 48512/1976 has proposed a method which comprises the addition to the saponification product of some other polymer possessed of high affinity for both the saponification product and the polyolefin. Specifically disclosed by this Japanese Patent publication is a laminated article which comprises a gas-barrier layer and polyolefin layers, the gas-barrier layer being made of a first saponification product of an ethylene-vinyl acetate copolymer having an ethylene content of 10 to 65 mol percent and a saponification degree of not less than 80 percent and a different kind of polymer. As the different kind of polymer, there is used either a second saponification product of an ethylene-vinyl acetate copolymer having an ethylene content of 70 to 98 mol percent and a saponification degree of not less than 20 percent or a mixture of the second saponification product with a polyolefin. The aforementioned addition to the first saponification product of either the second saponification product or the mixture thereof with a polyolefin indeed serves the purpose of improving the fastness with which the gas-barrier layer and the polyolefin layers are allowed to adhere to each other, but it nevertheless entails a problem of causing a degradation in the outstanding impermeability to gases (gas-barrier property) which constitutes a salient characteristic of the first saponification product used as the principal component of the gas-barrier layer. With respect to the permeability to oxygen gas, for example, it is shown in the aforementioned Japanese patent publication that the value which is not more than 5 cc/m$^2$/24 hours where the gas-barrier layer is made solely of the first saponification product is degraded to the order of 15 to 30 cc/m$^2$/24 hours where the gas-barrier layer is made of the composition of the first saponification product and the second saponification product combined, or not combined, with the polyolefin.

SUMMARY OF THE INVENTION

An object of the present invention, therefore, is to provide a multi-layer extruded article produced by the coextrusion process which comprises a gas-barrier layer and a polyolefin layer, the gas-barrier layer being made of a saponification product of an ethylene-vinyl acetate copolymer and being excellent in both impermeability to gases and adhesion between layers.

Another object of this invention is to provide, for the accomplishment of the object described above, some other polymers which are added to the aforementioned ethylene-vinyl acetate copolymer and is capable of improving the adhesion between the gas-barrier layer and the polyolefin layer without impairing the permeability of the saponification product of ethylene-vinyl copolymer to gases.

According to the present invention, there is provided a multi-layer extruded article comprising a gas-barrier layer and one polyolefin layer laminated on at least one of the opposite sides of the gas-barrier layer, the gas-barrier layer being made of a mixture comprising (a) an ethylene-vinyl acetate copolymer having an ethylene content of from 25 to 60 mol percent and a saponification degree of not less than 90 percent (Saponification Product A), (b) an ethylene-vinyl acetate copolymer having an ethylene content of from 60 to 98 mol percent and a saponification degree of not less than 20 percent (Saponification Product B), and (c) a polyvinyl alcohol having an average polymerization degree of from 300 to 3000 and a saponification degree of not less than 70 percent, wherein the ratio of the amounts of the aforementioned two saponification products (A:B) is in the range of from 98:2 to 50:50 by weight and wherein the amount of the polyvinyl alcohol is in the range of from 5 to 100 parts by weight per 100 parts by weight of the total weight of the two saponification products (A and B).

DETAILED DESCRIPTION OF THE INVENTION

A multi-layer extruded article involved in the present invention is produced preferably by the coextrusion process, the multi-layer extruded article comprising a gas-barrier layer and a polyolefin layer, the gas-barrier layer made of a mixture comprising a saponification product A of an ethylene-vinyl acetate copolymer, a saponification product B of an ethylene-vinyl acetate copolymer having a different ethylene content from the saponification product A, and a polyvinyl alcohol.

The saponification product A to be used in the present invention is a saponification product of an ethylene-vinyl acetate copolymer which has an ethylene content of from 25 to 60 mol percent, preferably from 25 to 50 mol percent, and a saponification degree of not less than 90 percent, preferably not less than 96 percent. When the ethylene content of the saponification product is less than 25 mol percent, the hydrophilicity and consequently the permeability to water vapor are much larger and the processibility in the extrusion molding is deteriorated. When the ethylene content exceeds 60 percent, the gas-barrier layer no longer possesses its impermeability to oxygen and other similar gases. When the saponification degree is lower than 90 percent, the gas-barrier layer fails to exhibit desired impermeability to oxygen and other similar gases. Thus, the saponification degree is not allowed to decrease below 90 percent.

The saponification product B is added to the saponification product A for the purpose of improving the affinity among the saponification product A, the polyvinyl alcohol and the polyolefin used in the formation of the extruded article. It is, therefore, a saponification product of an ethylene-vinyl acetate copolymer which has an ethylene content of from 60 to 98 mol percent, preferably from 70 to 95 mol percent, and a saponification degree of not less than 20 percent, preferably not less than 50 percent.

The polyvinyl alcohol to be used in this invention is a completely or partially saponified product which has an average polymerization degree of from 300 to 3000, preferably from 500 to 2000, and a saponification degree of not less than 70 percent.

The polyolefin layer, made of a homopolymer or copolymer of an olefin, suffices its object so far as it possesses an ability to protect the gas-barrier layer made of the aforementioned mixture. Although the polyolefin layer is not specifically restricted in any other respect, it is desired to possess low permeability to water vapor. Examples of polyolefins which are advantageously used for the layer include low-, medium- and high-density polyethylenes, polypropylene, ethylene-propylene copolymers, polybutene-1 and polypentene-1. Of course, the polyolefin which is used for this invention may contain therein other copolymer component in an amount small enough to avoid impairing the inherent properties of the polyolefin. Examples of such copolymers which are used advantageously for this invention include ethylene-vinyl acetate copolymers, ethylene-acrylic acid copolymers and ethylene-methacrylic acid copolymers.

The ratio at which the components of the mixture are used to form the gas-barrier layer in the present invention is quite important. The saponification product B is a component indispensable to the improvement of the adhesion between the gas-barrier layer and the polyolefin layer. The mixing ratio of the saponification product A to the saponification product B must be controlled so as to fall in the range of from 98:2 to 50:50. This range is critical because the adhesion between the layers is not sufficiently high when the saponification product B content is less than 2 percent, whereas the adhesion between the layers is increased but the impermeability to gases is notably degraded when the saponification product B content exceeds 20 percent. The polyvinyl alcohol is a component indispensable for the purpose of enhancing the impermeability of the gas-barrier layer to gases which tends to be impaired by addition of the saponification product B. The impermeability of the gas-barrier layer to gases increases with the increasing proportion of the polyvinyl alcohol in the mixture. When this proportion increases beyond 100 parts by weight per 100 parts by weight of the total amount of the two saponification products, A and B, however, the processability in extrusion molding is degraded to a point where it is difficult for the mixture to produce an ideal gas-barrier layer aimed at by the present invention. It is, therefore, critical that the proportion of the polyvinyl alcohol should be in the range of from 5 to 100 parts by weight, preferably from 10 to 95 parts by weight, per 100 parts by weight of the total amount of the two saponification products, A and B.

In order that the aforementioned mixture consisting of the three components, i.e. the saponification product A, the saponification product B, and the polyvinyl alcohol, may enable the gas-barrier layer to retain its impermeability to gases at a high level, it is desirable to keep the vinyl alcohol concentration above the level of 60 percent, preferably above the level of 70 percent, by weight. Optionally, the mixture may incorporate therein either an ethylene-vinyl acetate copolymer or modified polyolefin in an amount not exceeding 20 parts by weight per 100 parts by weight of the mixture.

The multi-layer articles of the present invention are produced by the coextrusion process in the form of bottles, tanks, tubes, films, sheets and pipes which are used for packaging food products in general, industrial chemicals, gasoline, chemically prepared pharmaceuticals, etc.

Now, the present invention will be further explained reference to working examples herein below.

EXAMPLE 1

Mixtures were prepared by mixing a saponification product A having an ethylene content of 40 mol percent and a saponification degree of 98 percent and a saponification product B having an ethylene content of 80 mol percent and a saponification degree of 80 percent at varying mixing ratios (by weight) of 100:0, 98:2, 95:5, 80:20, 50:50 and 40:60. Each of the mixtures was combined with a varying amount, i.e. 5, 50, 95 or 120 parts by weight per 100 parts by weight of the mixture, of a polyvinyl alcohol having an average polymerization degree of 500 and a saponification degree of 98 percent. By use of two extruding machines and a coextrusion type blow molding machine incorporating a three-layer coextruding die, there were molded bottles of a wall construction comprising a gas-barrier layer made of a varying mixture mentioned above and low-density polyethylene layers laminated on the opposite sides of the gas-barrier layer, the low-density polyethylene having a density of 0.93 g/cc and a melt index of 0.4 g/10 min.

The three-layer bottles thus produced in a cylindrical shape had an inner volume of 300 cc and weighed 15 g.

The weight ratio of the intermediate layer to the inner and outer layers was 1:15.

A sample strip 25 mm in width was cut from the barrel portion of each of the three-layer bottles and tested for peeling strength by way of evaluation of adhesion between layers. In a tester for permeability to oxygen gas, each of the three-layer bottles was tested for permeability to oxygen gas at normal room temperature by way of evaluation of impermeability to gases.

The results of these tests are shown in Table 1.

TABLE 1

| Run No. | Composition ratio of mixture (by weight) | | | Peeling strength (g/25 mm) | Permeability to oxygen (cc/m²/24 hrs) |
|---|---|---|---|---|---|
| | Saponification product A | Saponification product B | Polyvinyl alcohol | | |
| 1 | 100 | 0 | 0 | 40 | 4.0 |
| 2 | 100 | 0 | 5 | 30 | 3.8 |
| 3 | 100 | 0 | 50 | 0 | 2.5 |
| 4 | 100 | 0 | 100 | Difficult to mold | |
| 5 | 98 | 2 | 0 | 180 | 4.3 |
| 6 | 98 | 2 | 5 | 170 | 4.0 |
| 7 | 98 | 2 | 50 | 150 | 2.6 |
| 8 | 98 | 2 | 95 | 110 | 2.1 |
| 9 | 98 | 2 | 120 | Difficult to mold | |
| 10 | 95 | 5 | 0 | 250 | 5.1 |
| 11 | 95 | 5 | 5 | 220 | 4.6 |
| 12 | 95 | 5 | 50 | 170 | 2.7 |
| 13 | 95 | 5 | 95 | 140 | 2.3 |
| 14 | 95 | 5 | 120 | Difficult to mold | |
| 15 | 80 | 20 | 0 | 530 | 12 |
| 16 | 80 | 20 | 5 | 490 | 10 |
| 17 | 80 | 20 | 50 | 400 | 3.9 |
| 18 | 80 | 20 | 95 | 340 | 2.8 |
| 19 | 80 | 20 | 120 | Difficult to mold | |
| 20 | 50 | 50 | 0 | 620 | 130 |
| 21 | 50 | 50 | 5 | 600 | 77 |
| 22 | 50 | 50 | 50 | 510 | 11 |
| 23 | 50 | 50 | 95 | 450 | 5.0 |
| 24 | 50 | 50 | 120 | Difficult to mold | |
| 25 | 40 | 60 | 0 | 670 | 340 |
| 26 | 40 | 60 | 5 | 660 | 220 |
| 27 | 40 | 60 | 50 | Difficult to mold | |

It is clear from Table 1 that the addition of the saponification product B to the saponification product A serves to increase the peeling strength or the adhesion between layers and the further addition of the polyvinyl alcohol serves to decrease the permeability to oxygen or increase the impermeability to gases.

EXAMPLE 2

Mixtures were prepared by mixing a saponification product A having an ethylene content of 28 mol percent and a saponification degree of 99 percent and a saponification product B having an ethylene content of 90 mol percent and a saponification degree of 75 percent at varying mixing ratios (by weight) of 100:0, 90:10, and 70:30. Each of the mixtures was combined with a varying amount, i.e. 10, 30, 100, 120, or 200 parts by weight per 100 parts by weight of the mixture, of a polyvinyl alcohol mixture comprising a completely saponified polyvinyl alcohol having an average polymerization degree of 750 and a saponification degree of 98 percent and a partially saponified polyvinyl alcohol having an average polymerization degree of 1000 and a saponification degree of 87 percent at a weight ratio of 1:1. By use of a coextrusion type inflation molding machine, there were produced two-layer films comprising a gas-barrier layer made of a varying mixture mentioned above and a polypropylene layer laminated on one of the opposite sides of the gas-barrier layer, the polypropylene having a density of 0.90 g/cc and a melt index of 8 g/10 min.

The two-layer films thus produced had a total thickness of about 50μ, including the outer layer of a thickness of 15μ. The two-layer films were tested for peeling strength and permeability to oxygen gas. The results of the tests are shown in Table 2.

It is clear from Table 2 that the addition of the saponification product B to the saponification product A improves the adhesion between layers and the further addition of the polyvinyl alcohol enhances the impermeability to gases.

TABLE 2

| Run No. | Composition ratio of mixture (by weight) | | | Peeling strength (g/25mm) | Permeability to oxygen (cc/m²/24hrs) |
|---|---|---|---|---|---|
| | Saponification product A | Saponification product B | Polyvinyl alcohol | | |
| 28 | 100 | 0 | 0 | 20 | 2.3 |
| 29 | 100 | 0 | 10 | 0 | 2.2 |
| 30 | 100 | 0 | 30 | 0 | 2.1 |
| 31 | 100 | 0 | 120 | Difficult to mold | |
| 32 | 90 | 10 | 0 | 180 | 3.2 |
| 33 | 90 | 10 | 10 | 170 | 2.9 |
| 34 | 90 | 10 | 30 | 150 | 2.7 |
| 35 | 90 | 10 | 100 | 120 | 2.4 |
| 36 | 70 | 30 | 0 | 410 | 14 |
| 37 | 70 | 30 | 10 | 390 | 9.8 |
| 38 | 70 | 30 | 30 | 360 | 6.5 |
| 39 | 70 | 30 | 100 | 290 | 3.6 |
| 40 | 70 | 30 | 200 | Difficult to mold | |

What is claimed is:

1. A multi-layer extruded article comprising a gas-barrier layer and a polyolefin layer laminated on at least one of the opposite sides of the gas-barrier layer, the gas-barrier layer being made of a mixture comprising (a) a saponification product of an ethylene-vinyl acetate copolymer having an ethylene content of from 25 to 50 mol percent and a saponification degree of not less than 90 percent (Saponification Product A), (b) a saponification product of an ethylene-vinyl acetate copolymer having an ethylene content of from 60 to 98 mol percent and a saponification degree of not less than 20 percent (Saponification Product B), and (c) a polyvinyl alcohol having an average polymerization degree of from 300 to 3000 and a saponification degree of not less than 70 percent, wherein the ratio of the amounts of the aforementioned two saponification products (A:B) is in the range of from 98:2 to 50:50 by weight and wherein the amount of the polyvinyl alcohol is in the range of from 5 to 100 parts by weight per 100 parts by weight of the total weight of the two saponification products (A and B).

2. The multi-layer extruded article according to claim 1, wherein the saponification product A is a saponification product of an ethylene-vinyl acetate copolymer which has a saponification degree of not less than 96 percent.

3. The multi-layer extruded article according to claim 1, wherein the saponification product B is a saponification product of an ethylene-vinyl acetate copolymer which has an ethylene content of from 70 to 95 mol percent and a saponification degree of not less than 50 percent.

4. The multi-layer extruded article according to claim 1, wherein the polyvinyl alcohol has an average polymerization degree of from 500 to 2000.

5. The multi-layer extruded article according to claim 1, wherein the polyolefin is one member selected from the group consisting of low-density polyethylene, medium-density polyethylene, high-density polyethylene, polypropylene, ethylene-propylene copolymers, polybutene-1 and polyheptene-1.

6. The multi-layer extruded article according to claim 1, which is formed in a three-layer construction comprising a gas-barrier layer as an intermediate layer and polyolefin layers respectively laminated on the opposite sides of the intermediate layer.

7. The multi-layer extruded article according to claim 1 or claim 6, wherein the extruded article is formed by the coextrusion process.

* * * * *